United States Patent [19]

Kawamura et al.

[11] Patent Number: 5,281,008
[45] Date of Patent: Jan. 25, 1994

[54] TRACTION CONTROL SYSTEM FOR MOTOR VEHICLE

[75] Inventors: Makoto Kawamura, Hiroshima; Toshiaki Tsuyama, Higashihiroshima; Kazutoshi Nobumoto; Haruki Okazaki, both of Hiroshima, all of Japan

[73] Assignee: Mazda Motor Corporation, Hiroshima, Japan

[21] Appl. No.: 904,311

[22] Filed: Jun. 25, 1992

[30] Foreign Application Priority Data

Jun. 25, 1991 [JP] Japan .................. 3-153354

[51] Int. Cl.⁵ .................. B60T 8/32; B60T 8/58
[52] U.S. Cl. .................. 303/100; 180/197; 364/424.1; 364/426.02; 364/426.03; 303/93; 303/103
[58] Field of Search .................. 180/197; 303/100, 93, 303/102, 103, 105, 106, 107, 108, 109, 110, 111, 113.2, 113.3; 364/426.02, 426.03, 426.04, 426.01, 424.1; 123/333, 336, 342, 360; 188/181 C, 181 R, 181 A

[56] References Cited

U.S. PATENT DOCUMENTS

| | | | |
|---|---|---|---|
| 4,933,857 | 6/1990 | Hashiguchi ete al. | 303/100 X |
| 4,970,650 | 11/1990 | Hashiguchi et al. | 180/197 X |
| 4,985,838 | 1/1991 | Hashiguchi et al. | 180/197 X |
| 5,000,281 | 3/1991 | Nobumoto et al. | 303/102 X |
| 5,025,882 | 6/1991 | Ghoneim et al. | 180/197 |
| 5,070,461 | 12/1991 | Nobumoto et al. | 303/103 X |
| 5,077,672 | 12/1991 | Nobumoto et al. | 303/103 X |
| 5,159,991 | 11/1992 | Tsuyama et al. | 180/197 |

FOREIGN PATENT DOCUMENTS 63-263243 10/1988 Japan .

Primary Examiner—Douglas C. Butler
Attorney, Agent, or Firm—Fish & Richardson

[57] ABSTRACT

A traction control system for a motor vehicle having driving wheels and driven wheels. The traction control system comprises sensors for detecting a speed of each of the driving wheels of the vehicle; sensors for detecting a speed of each of the driven wheels of the vehicle; and a mechanism for calculating a slip value of the driving wheels based on the detected speeds of the driving and driven wheels. The traction control system also includes an engine output control mechanism for controlling each of the driving wheels so that the slip value of each of the driving wheels is controlled to become equal to a predetermined first desired slip value when the slip value of each driving wheel is greater than the predetermined first desired slip value; and a brake force control mechanism for controlling each of the driving wheels so that the slip value of each of the driving wheels is controlled to become equal to a predetermined second desired slip value when the slip value of each driving wheel is greater than the predetermined second desired slip value. The control system also includes an engine control restriction mechanism for restricting the engine output control mechanism while the braking control is carried out.

14 Claims, 6 Drawing Sheets

TRACTION CONTROL SYSTEM FOR MOTOR VEHICLE

BACKGROUND OF THE INVENTION

1. Field of the Invention

The present invention relates to a traction control system for a motor vehicle, and in particular to a traction control system in which a slip value of a driving wheel is controlled by employing an estimated friction coefficient of a road surface.

2. Description of the Related Art

One type of traction control system for a motor vehicle detects a slip value of a driving wheel and controls an output of an engine and braking force so that the slip value of the driving wheel is equal to a predetermined desired slip value. The traction control system is used to prevent a decrease in acceleration of the vehicle caused by the slip which is caused by an excessive driving torque of the driving wheels in an accelerating operation and the like.

The conventional traction control system as shown in Japanese Patent Laid-Open Publication No. 63-263243 controls the output of the engine by using a combination of leaning the air-fuel ratio, retarding the ignition timing and controlling the number of operating cylinders.

In the conventional traction control system, it is difficult to utilize the engine output control for the traction control for the purpose of reducing the work load of the braking system. The reason is that while the driving torque can be reduced rapidly when the braking force is controlled, the driving torque can not be reduced rapidly when the engine output is controlled. Namely, the actual reduction of the output torque of the engine is followed by a certain delay time after the start of the control. Even if the traction control system detects a slip value of the driving wheels and controls the output of the engine, for example, by retarding ignition timing, at the time the actual engine control starts, the slip value of driving wheel already has become close to the predetermined desired slip value by the operation of the braking force. Further, at the time the actual engine control starts, the traction control system detects the current slip value of the driving wheels for a determination of the next engine control. In this condition, the retarding value of the ignition timing is controlled to reduce the value, namely the engine control is controlled toward advancing the timing. Accordingly, hunting of the engine output is caused and the engine output control is not properly operated.

SUMMARY OF THE INVENTION

It is therefore an object of the present invention to provide a traction control system for a motor vehicle which is able to restrict the increase of the output of the engine by the engine control device.

It is another object of the present invention to provide a traction control system for a motor vehicle which is able to restrict the increase of the output of the engine when it is actually demanded to reduce the output of the engine.

The above object is achieved, according to the present invention, by providing a traction control system for a motor vehicle having driving wheels and driven wheels. The traction control system comprises sensors for detecting a speed of each of the driving wheels of the vehicle; sensors for detecting a speed of each of the driven wheels of the vehicle; and a mechanism for calculating a slip value of the driving wheels based on the detected speeds of the driving and driven wheels. The traction control system also includes an engine output control mechanism for controlling each of the driving wheels so that the slip value of each of the driving wheels is controlled to become equal to a predetermined first desired slip value when the slip value of each driving wheel is greater than the predetermined first desired slip value; and a brake force control mechanism for controlling each of the driving wheels so that the slip value of each of the driving wheels is controlled to become equal to a predetermined second desired slip value when the slip value of each driving wheel is greater than the predetermined second desired slip value. The control system also includes an engine control restriction mechanism for restricting the engine output control mechanism while the braking control is carried out.

In a preferred embodiment of the present invention, the engine control restriction means restricts the operation of the engine control when the braking forces to the right and left driving wheels are increasing.

The above and other objects and features of the present invention will be apparent from the following description with reference to the accompanying drawings describing the preferred embodiments of the invention.

DETAILED DESCRIPTION OF THE PREFERRED EMBODIMENTS

The present invention will now be explained with reference to the preferred embodiments and the drawings.

Figure 1:
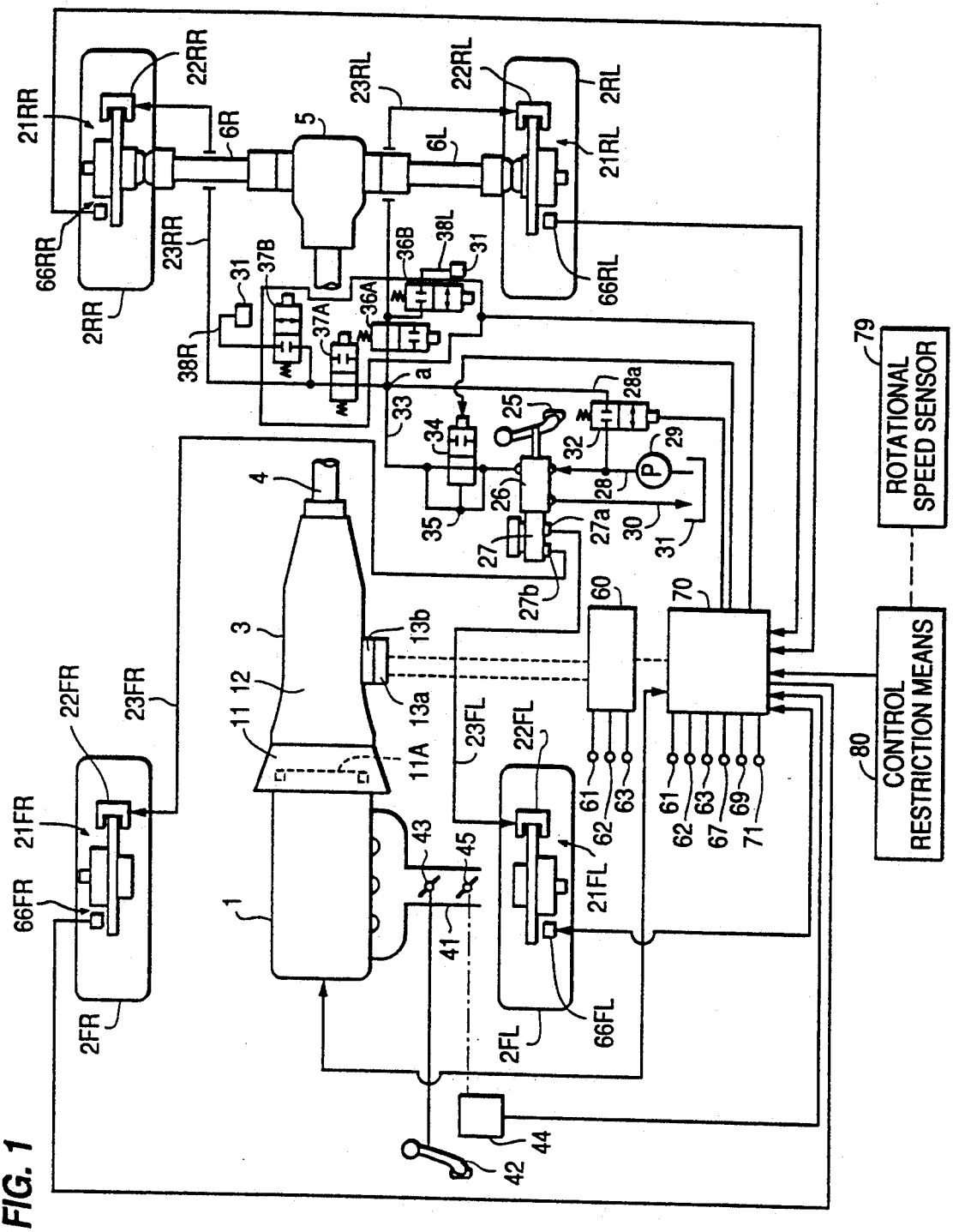
FIG. 1 is an overall schematic diagram of the traction control system in accordance with the present invention.

FIG. 1 is an overall schematic diagram of a traction control system in accordance with the present invention. Referring to FIG. 1, there is shown a motor vehicle having a traction control system in accordance with an embodiment of the present invention. The vehicle has right and left front wheels 2FR, 2FL which are the driven wheels, and right and left rear wheels 2RR, 2RL which are the driving wheels.

A driving system includes an engine disposed in the front portion of the vehicle, an automatic transmission 3 connected directly to a crankshaft of the engine 1, a propeller shaft 4 connected to an output shaft of the automatic transmission 3, a differential 5 connected to the rear end portion of the propeller shaft 4, and driving shafts 6R, 6L extending from the differential 5 to the right and left directions respectively and connected to the right rear wheel 2RR and the left rear wheel 2RL respectively.

Construction of the Automatic Transmission

The automatic transmission 3 comprises a torque converter 11 and a multiple-stage transmission gear mechanism 12. The transmission control operation is carried out by selecting combinations of magnetization and/or demagnetization of a plurality of solenoids 13a which are incorporated in a hydraulic control circuit for the automatic transmission 3. The torque converter 11 is provided with a lockup clutch 11A operated by hydraulic pressure. The connection and disconnection of the lockup clutch 11A is carried out by selecting magnetization or demagnetization of a solenoid 13b which is incorporated in the hydraulic control circuit.

The solenoids 13a, 13b are controlled by a control unit 60 for the automatic transmission 3. The control unit 60 stores transmission characteristics and lockup characteristics and in accordance with these characteristics carries out the transmission and lockup controls. In order to carry out these control operations, the following signals are input to the control unit 60: a main throttle opening signal from a main throttle sensor 61 detecting an opening of a main throttle valve 43, a sub throttle opening signal from a sub throttle sensor 62 detecting an opening of a sub throttle valve 45, and a vehicle speed signal from a vehicle speed sensor 63 detecting a rotation speed of the propeller shaft 4. The main throttle valve 43 is disposed in an intake 41 and it is actuated by pedal 42.

Construction of the Brake Fluid Pressure Adjustment Mechanism

Brakes 21FR, 21FL, 21RR, and 21RL are provided in wheels 2FR, 2FL, 2RR, and 2RL, respectively. Brake fluid pressure is supplied to respective calipers (brake cylinders) 22FR, 22FR, 22RR, and 22RL of the brakes 21FR, 21FL, 21RR, and 21RL through respective brake conduits 23FR, 23RL, 23RR, and 23RL.

Supply of the brake fluid pressure to the respective brakes 21FR, 21FL, 21RR, and 21RL is carried out as follows. First, braking force on a brake pedal 25 is boosted by a hydraulic booster 26 and transmitted to a tandem type master cylinder 27, which is in turn transmitted to the front wheel brake 21FR through the brake conduit 23FR connected to a first discharge outlet 27b of the master cylinder 27 and to the front wheel brake 21FL through the brake conduit 23FL connected to a second discharge outlet 27a of the master cylinder 27.

A pump 29 is connected to the booster 26 through a conduit 28. The pump 29 supplies the fluid in a reservoir 31 to the booster 26, and the excessive fluid in the booster 26 is returned back to the reservoir 31 through a conduit 30. A branch conduit 28a with a solenoid switching valve 32 is connected to the conduit 28. A conduit 33 is connected to the booster 26, and a solenoid switching valve 34 and a one way valve 35 are connected in parallel to the conduit 33.

The conduit 33 communicates with the branch conduit 28a at a junction point (a) and branches into brake conduits 23RR, 23RL for the rear wheels 21RR, 21RL. A solenoid switching valve 37A is connected to the conduit 23RR and a solenoid switching valve 36A is connected to the conduit 23RL. The brake conduits 23RR, 23RL are provided with relief conduits 38R, 38L which are branched on the downstream portion of the solenoid switching valves 37A, 36A and communicate to the reservoir 31 respectively. The relief conduits 38R, 38L are provided with solenoid switching valves 37B, 36B.

The above-mentioned valves 32, 34, 36A, 37A, 36B and 37B are controlled by the traction control unit 70. Namely, when the brake control operation for the slip control is not carried out, as shown in FIG. 1, the valve 32 is closed and the valve 34 is opened, and further the valves 36A, 37A are opened and the valves 36B, 37B are closed. Therefore, when the brake pedal 25 is operated, the brake fluid pressure is supplied to the brakes 21FR, 21FL for the front wheels 2FR, 2FL through the master cylinder 27 and brake fluid pressure is supplied to the brakes 21RR, 21RL for the rear wheels 2RR, 2RL through the conduit 33 of the booster 26.

When the brake control operation for the slip control explained below is carried out, the valve 34 is closed and the valve 32 is opened. A duty control on the valves 36A, 36B, 37A and 37B is carried out so as to maintain, increase or decrease the brake fluid pressure. Under the condition of the valve 32 being closed, the brake fluid pressure is maintained by closing valves 36A, 36B, 37A and 37B, and is increased by opening valves 36A, 37A and closing valves 36B, 37B, and is decreased by closing valves 36A, 37A and opening valves 36B, 37B. The one way valve 35 is provided so that the brake fluid pressure from the branch conduit 28a does not work as a reaction force to the brake pedal 25.

When the brake control operation for the slip control is carried out and then the brake pedal 25 is operated, the brake fluid pressure of the booster 26 corresponding to the braking force of the brake pedal 25 is supplied through the one way valve 35 to the brakes 21RR, 21RL for the rear wheels 2RR, 2RL.

Construction of the Engine Torque Adjustment Device

The control unit 70 for the traction control carries out not only the brake control operation by which the torque applied to the driving wheels or rear wheels 2RR, 2RL is decreased, but also the engine control operation by which the torque generated by the engine 1 is decreased. For the engine control, the ignition timing control is carried out. In general, as a retard value of the ignition timing increases, the output torque of the engine decreases.

Construction of the Control Unit for the Traction Control

The control unit 70 for the traction control in the slip control operation carries out the brake control and the engine control. The signals of the wheel speed sensors 66FR, 66FL, 66RR and 66RL which detect the speeds of each of the wheels are inputted to the control unit 70. In addition, various other signals are inputted such as the main throttle opening sensor 61, the sub throttle opening sensor 62, the vehicle speed sensor 63, the acceleration opening sensor 67, the steering angle sensor 69, and the manual selection switch 71.

The control unit 70 is provided with an input interface for receiving the signals from each of the above sensors, a microcomputer having a CPU, a ROM and a RAM, an output interface, and a drive circuit for driving valves 32, 34, 36A, 37A, 36B, 37B and the actuator 44. The programs necessary for the traction control and various maps are stored in the ROM. The various memories necessary for carrying out the traction control are provided in the RAM.

Contents of the Traction Control

Figure 2:
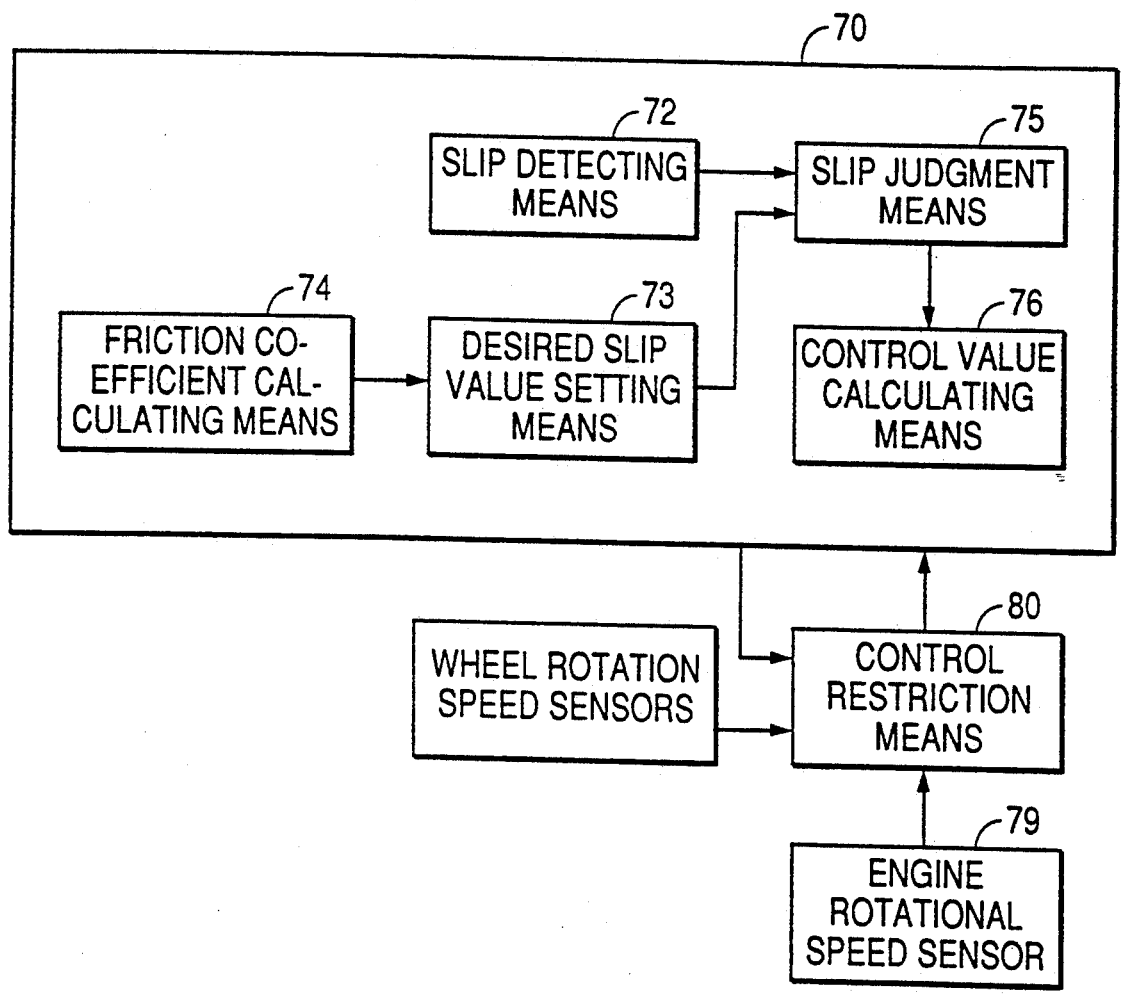
FIG. 2 is a block diagram of the traction control system in accordance with the present invention.

As shown in FIG. 2, the control unit 70 is provided with a slip detecting means 72, desired slip value setting means 73, friction coefficient of the road surface calculating means 74, slip judgment means 75 and control value setting means 76.

Slip Detecting Means 72

The slip value of the driving wheel is determined based on the output signals of the wheel rotation speed sensors 66FR, 66FL, 66RR, 66RL. The slip detecting means 72 calculates the slip value by subtracting the driven wheel rotation speed from the driving wheel rotation speed. For control output of the engine, the larger driving wheel rotation speed is selected between the right and left driving wheels, and driven wheel speed is set as an average rotation speed of the right and left driving wheel. On the other hand, for control braking force, the driving wheel rotation speed is set the same as above, but both right and left driving wheel rotation speeds are utilized for control of each brake force independently.

Desired Slip Value Setting Means 73

Figure 3:
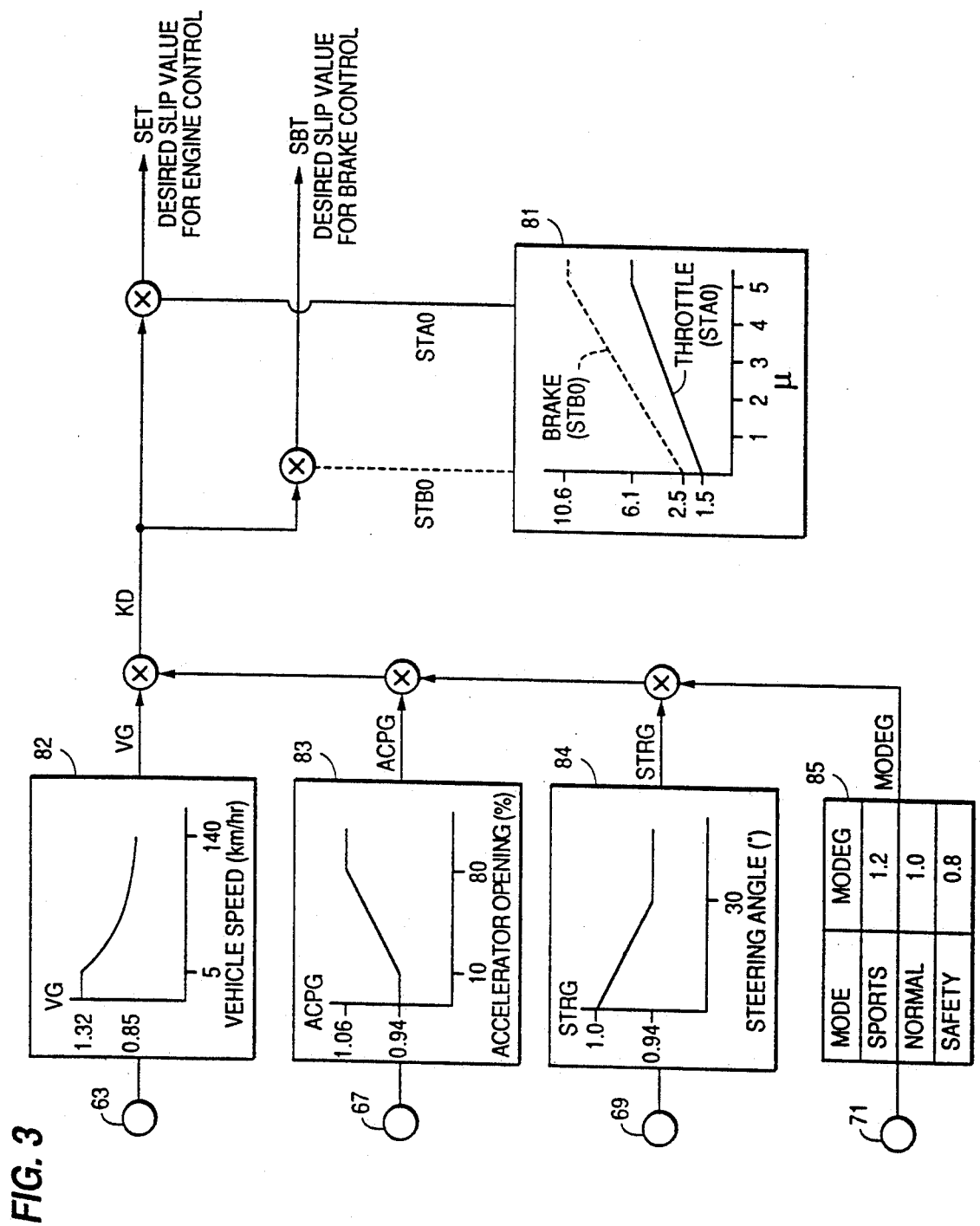
FIG. 3 is a block diagram showing a circuit for determining the respective desired slip values of the brake control and the engine control.

Referring to FIG. 3, desired slip value SET for the engine control and desired slip value SBT for the braking force are determined by parameters of the vehicle speed, the accelerator opening, the steering angle, the mode selected by the manual selection switch 71, and the friction coefficient of the road surface. The SBT is larger than the SET. Namely, a basic value STBO of the desired slip value SBT and a basic value STAO of the desired slip value SET are stored respectively in the map 81 whose parameter is friction coefficient of the road surface. As the value of the friction coefficient increases, STAO and STBO increases (STBO > STAO). The desired slip value SET and SBT are obtained respectively by multiplying the respective basic value STAO and STBO by a correction gain KD. The basic value STBO is larger than the basic value STAO.

The correction gain KD is obtained by multiplying a gain coefficient VG by gain coefficients ACPG, STRG, and MODEG. The gain coefficient VG is provided so as to obtain the stability of the vehicle and is given by a map 82 as a function of the vehicle speed. The gain coefficient ACPG is provided so as to obtain the driving force of the wheels in accordance with the acceleration demanded of the driver and is given by a map 83 as a function of the accelerator opening. The gain coefficient STRG is provided so as to obtain the stability of the vehicle in the steering operation and is given by a map 84 as a function of the steering angle. The gain coefficient MODEG is given by a table 85 and is manually selected by the driver from three modes, namely sports mode, normal mode and safety mode.

Friction Coefficient of the Road Surface Calculating Means

The friction coefficient is determined based on a vehicle speed Vr and a vehicle acceleration Vg. From the time the slip control starts until it reaches to 500 ms, the vehicle acceleration Vg is calculated every 100 ms based on the change ratio per 100 ms of the vehicle speed Vr, in this embodiment. Either of the wheel rotational speeds of the left and right front wheels 2FL and 2FR, can be calculated by using formula (1). On the other hand, after 500 ms from the start of the slip control, the acceleration Vg is calculated every 100 ms based on the change ratio per the latest 500 ms of the vehicle speed Vr using formula (2). For assistance in the calculation of the vehicle acceleration Vg, a counter A counts 100 ms and a counter B counts 500 ms.

$$Vg = GK1 \times \{Vr(K) - Vr(K-100)\} \quad (1)$$

$$Vg = GK2 \times \{Vr(K) - Vr(K-500)\} \quad (2)$$

where GK1 and GK2 are constants, Vr (K) indicates the present condition, Vr (K−100) indicates 100 ms prior to the present, and Vr (K-500) indicates 500 ms prior to the present vehicle speed, respectively. The friction coefficient is then obtained from Table 1 by an interpolation of Vr and Vg.

TABLE 1

| Vr | Vg | | | | | | | | |
|---|---|---|---|---|---|---|---|---|---|
|  | 0.00 | 0.05 | 0.10 | 0.15 | 0.20 | 0.25 | 0.30 | 0.35 | 0.40 |
| 000 | 1.0 | 1.0 | 2.0 | 2.0 | 3.0 | 3.0 | 4.0 | 4.0 | 5.0 |
| 020 | 1.0 | 1.0 | 2.0 | 2.0 | 3.0 | 4.0 | 4.0 | 5.0 | 5.0 |
| 040 | 1.0 | 1.0 | 2.0 | 3.0 | 3.0 | 4.0 | 4.0 | 5.0 | 5.0 |
| 060 | 1.0 | 1.0 | 2.0 | 3.0 | 4.0 | 4.0 | 5.0 | 5.0 | 5.0 |
| 080 | 1.0 | 1.0 | 2.0 | 3.0 | 4.0 | 5.0 | 5.0 | 5.0 | 5.0 |
| 100 | 1.0 | 1.0 | 2.0 | 4.0 | 4.0 | 5.0 | 5.0 | 5.0 | 5.0 |
| 120 | 1.0 | 2.0 | 3.0 | 4.0 | 5.0 | 5.0 | 5.0 | 5.0 | 5.0 |
| 140 | 1.0 | 2.0 | 3.0 | 5.0 | 5.0 | 5.0 | 5.0 | 5.0 | 5.0 |

Slip Judgment Means 75

Figure 4:
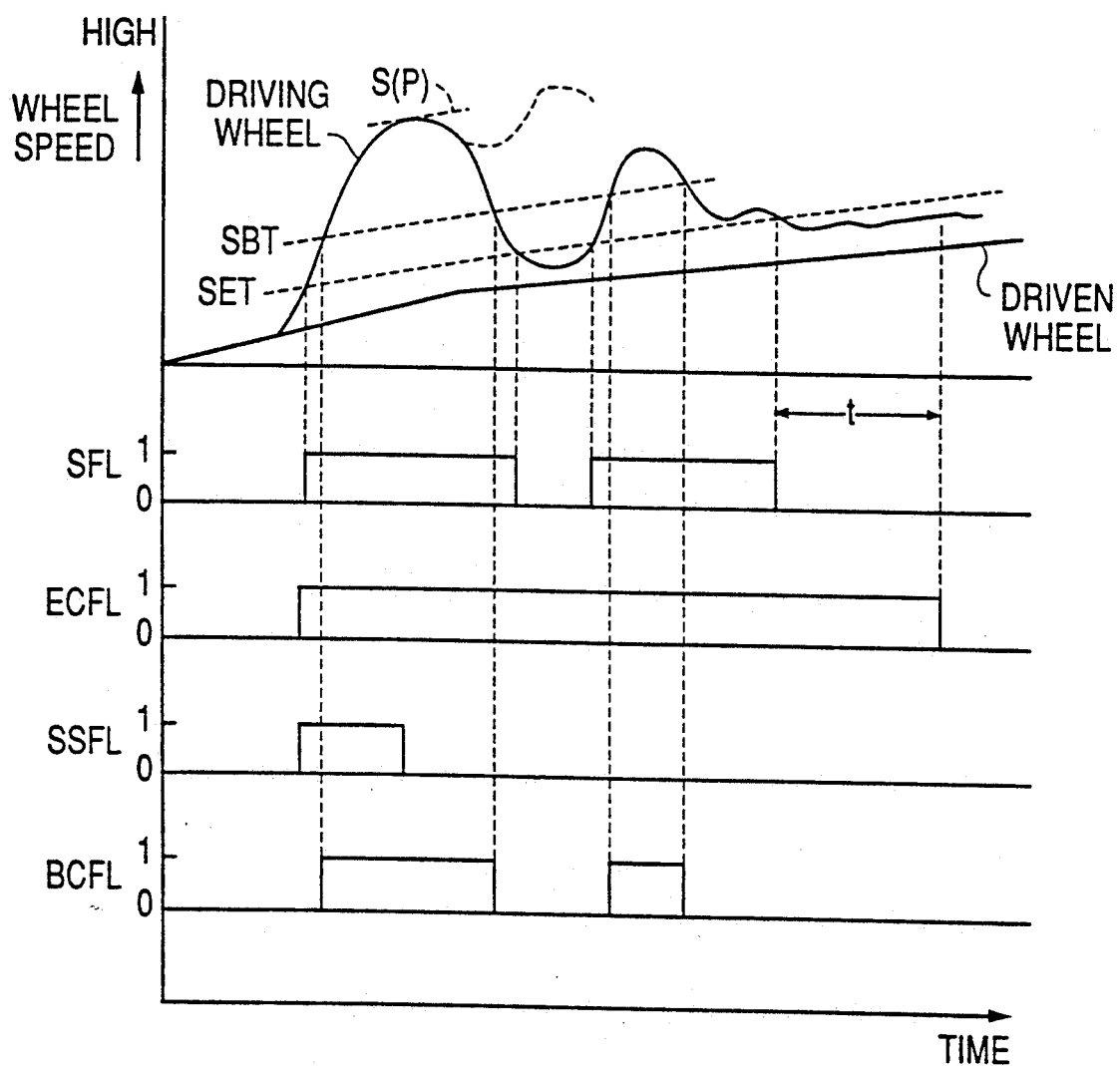
FIG. 4 is a time chart showing an outline of the traction control.

Slip judgment means 75 carries out its function based on the slip value S detected by the slip detecting means 72 and desired slip values SET and SBT. As shown in the time chart in the FIG. 4, the slip judgment means 75 proceeds with the following procedural conditions so as to control the start and end of the slip control.

Slip flag SFL is set to "1", if slip value S is greater than SET.

Engine control flag ECFL is set to "1", if the flag SFL changed from "0" to "1".

Engine control flag ECFL is set to "0", if the state of the flag SFL is "0" after a predetermined period has passed.

First slip flag SSFL is set to "1", if the flag ECFL is changed from "0" to "1".

First slip flag SSFL is set to "0", if the change rate of the slip value is zero.

Braking control flag BCFL is set to "1", if slip value S is greater than the SBT.

Control Value Calculating Means 76

The control value calculating means 76 selects the next following phases based on the first slip flag SSFL and the rate of change G of the slip value S, and calculates the control value in each of the phases based on a deviation EN of the actual slip value S and the desired slip value SBT, namely, it sets the brake control zone BZ. The control value in each of the phases is described as a braking control zone BZ hereinafter. The braking control zone BZ is set for each driving wheel 2RR, 2RL independently.

Phase 0: Increase the brake fluid pressure supplied to the driving wheel.

Phase 1: Decrease the brake fluid pressure supplied to the driving wheel.

Phase 2: Increase and decrease brake fluid pressure supplied to the driving wheel.

Figure 5:
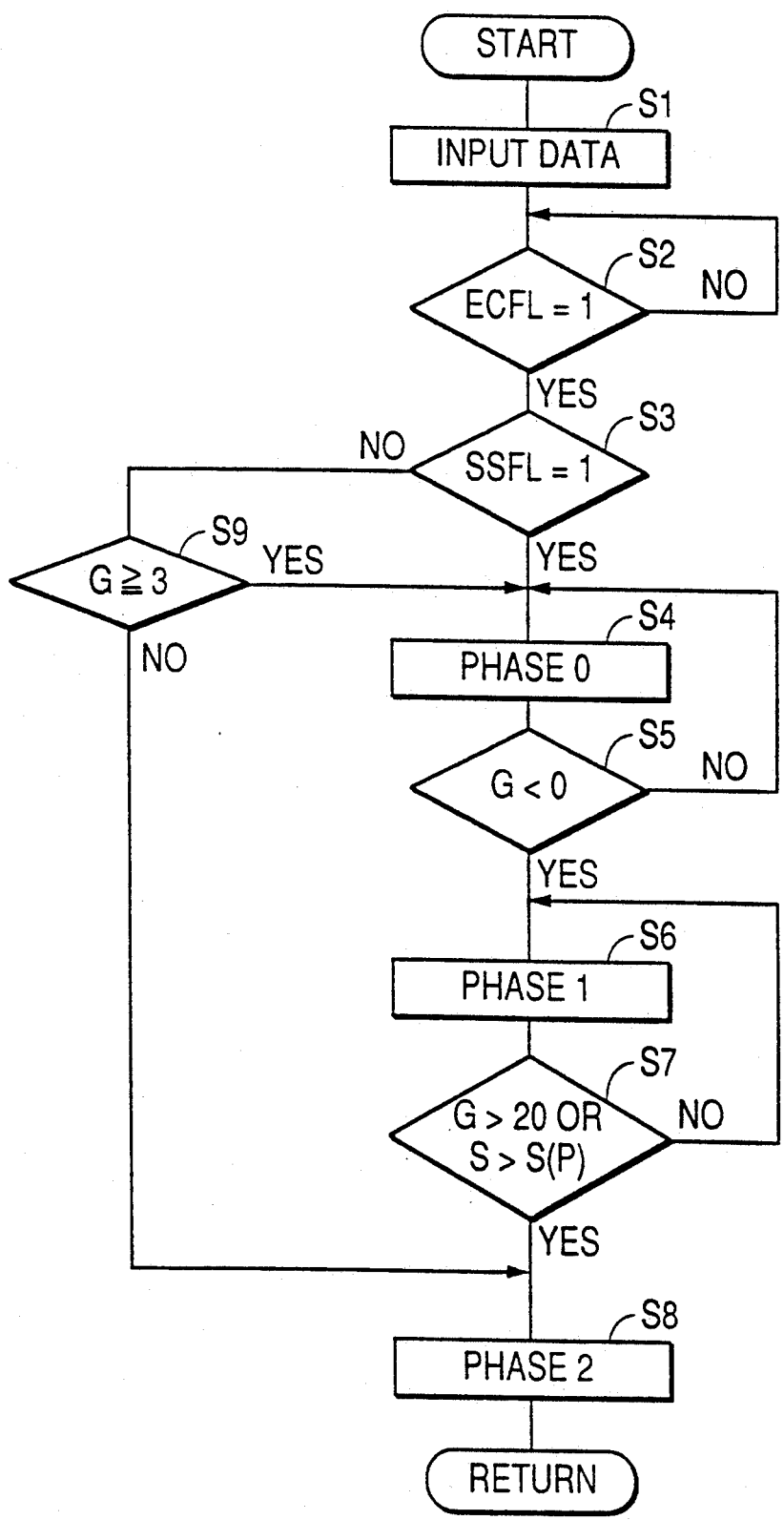
FIG. 5 is a flow chart showing a brake control of the traction control in accordance with the present invention.

FIG. 5 shows a flow chart for selecting the particular phase. When data (slip flag SFL, first slip flag SSFL, and slip value S) are inputted, and SFL changes from "0" to "1", it is determined whether engine control is demanded (ECFL=1) in step S2. If the answer is yes, it is determined whether it is the first time to detect a slip condition (SSFL=1) in step S3. If it is the first time, then phase 0 is selected in step S4. Then as time goes on, if the slip rate of change G becomes less than zero in step S5, then phase 1 is selected in step S6. If the slip rate of change G then becomes greater than 2.0, or the slip value S is greater than a peak slip value S(p) at a first slip condition, as indicated by the dotted line in the FIG. 4, then the phase 2 is selected (steps S7, S8). When it is the second time to detect the slip condition at step S3, a test is performed to see if the slip change rate G is greater than 3.0 in step S9. If so, then the phase 0 is selected in step S4. On the other hand, if the slip change rate G is smaller than 3.0 in step S9, then phase 2 is selected (steps S9-S8).

The control zone BZ is set based on the slip rate of change G, in the manner that if the phase 0 is selected, it is set from a map 2 (Table 2), if the phase 1 is selected, it is set from a map 3 (Table 3), and if the phase 2 is selected, it is set from a map 4 (Table 4). These maps show the states of brake fluid pressure control, namely the control zone BZ. Zo shows to hold the brake pressure, NS1, NS2, NM1, NM2, NB1, NB2 show the speed for increasing the brake pressure from slower speed increase to rapid speed increase (NS1< NS2< NM1< NM2< NB1< NB2), and PS1, PS1, PM1, PM2, PB1, PB2 show the speed for decreasing the brake pressure (PS1< PS2< PM1< PM2< PB1< PB2).

TABLE 2

| G | | | | | | | | | | | |
|---|---|---|---|---|---|---|---|---|---|---|---|
| (−) | | | | | 0 | | | | | | (+) |
| Zo | Zo | Zo | Zo | Zo | NS1 | NS2 | NM1 | NM2 | NB1 | NB2 |

TABLE 3

| G | | | | | | | | | | | |
|---|---|---|---|---|---|---|---|---|---|---|---|
| (−) | | | | | 0 | | | | | | (+) |
| PB2 | PB1 | PM2 | PM1 | PS2 | PS1 | Zo | Zo | Zo | Zo | Zo |

TABLE 4

| | G | | | | | | |
|---|---|---|---|---|---|---|---|
| | (−) | | | 0 | | | (+) |
| EN | (−) | PB2 | PB2 | PB1 | PB1 | PM2 | PM1 | PM1 |
| | | PB1 | PB1 | PB2 | PM1 | PS2 | PS2 | Zo |
| | | PM1 | PM1 | PS2 | PS2 | PS2 | Zo | Zo |
| O | | PS1 | PS1 | PS1 | PS1 | Zo | Zo | Zo |
| | | PS1 | Zo | Zo | Zo | NS1 | NM1 | NM2 |
| | | Zo | Zo | NS1 | NS1 | NS2 | NM1 | NM2 |
| | (+) | NS1 | NS1 | NS2 | NS2 | NM1 | NM2 | NM2 |

As an engine control value, an average value of the first brake control zone BZ of the right driving wheel and the second brake control zone BZ of the left driving wheel is set as an engine control zone EZ, and with the map 5 (table 5), an ignition retard value IGNT is set. In this case, as the brake control increases with speed, the retard value of ignition becomes larger. The retard control is not carried out when the Zo or PS1-PB2 is set.

TABLE 5

| EZ | PB2 | PB1 | PM2 | PM1 | PS2 | PS1 | Zo | NS1 | NS2 | NM1 | NM2 | NB1 | NB2 |
|---|---|---|---|---|---|---|---|---|---|---|---|---|---|
| IGNT | 0 | 0 | 0 | 0 | 0 | 0 | 0 | −10 | −20 | −20 | −20 | −30 | −30 |

Control Restriction Means 80

The control restriction means 80 restricts the control means 70 to increase the output of the engine while the brake control is carried out and the following conditions are satisfied.

First condition: Both right and left driving wheels are set to phase 0.

Second condition: Engine rotational speed N is greater than a minimum predetermined value N(min).

Third condition: Engine rotational speed N is increasing.

The engine rotational speed N is detected by the rotational speed sensor 79. The minimum predetermined value V(min) is given by a map 6 (Table 6) as functions of a sum of average of the left and right driven wheel speed detected at the wheel speed sensor 66FR and 66Fl and the basic value of the engine control STAO, and a gear position of the automatic transmission 3. To determine whether or not the engine speed increasing, a comparison of the last detected value N(k−1) with the present detected value N(k) is performed.

TABLE 6

| | Sum of average driven wheel speed and basic value STAO (km/h) | | | | | | | | | | |
|---|---|---|---|---|---|---|---|---|---|---|---|
| GEAR POSITION | 0 | 10 | 20 | 30 | 40 | 50 | 60 | 70 | 80 | 90 | 100 |
| 1 | 700 | 1500 | 2500 | 3500 | 4500 | 5500 | 6500 | 7500 | 8000 | 8000 | 8000 |
| 2 | 800 | 1200 | 1700 | 2200 | 2700 | 3200 | 3700 | 4200 | 4700 | 5200 | 5700 |
| 3 | 600 | 1000 | 1500 | 2000 | 2500 | 3000 | 3500 | 4000 | 4500 | 5000 | 5500 |
| 4 | 550 | 700 | 1200 | 1700 | 2200 | 2700 | 3200 | 3700 | 4200 | 4700 | 5200 |

Control Flow

Figure 6:
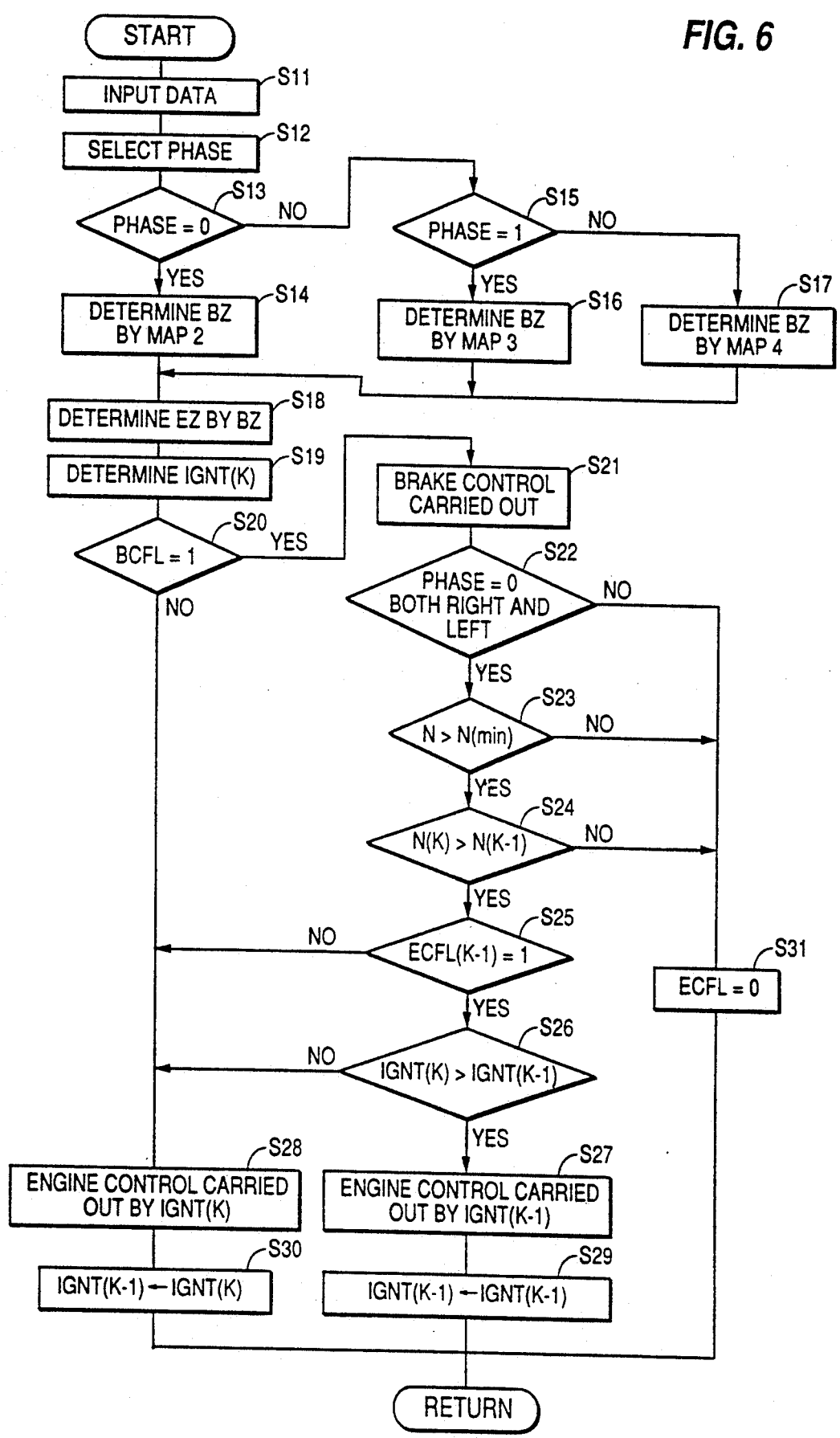
FIG. 6 is a flow chart showing a slip control of the traction control in accordance with the present invention.

FIG. 6 shows the flow chart of the control according to the present invention. In the flow chart, the selection of the phase (S12) by input of each data is done as shown in FIG. 5. A test is then performed to see if phase 0 was selected in step S13. The control zone BZ is then set by the map 2. If the determination in step S13 is that the phase is not phase 0, another test is performed in step S15 to see if phase 1 was selected. If the answer is yes, the phase 1 control zone BZ is set by the map 3. If the answer is no, the other phase (e.g., phase 3) control zone BZ is set by the map 4 in step S17.

Above mentioned phase selection and determination of the brake control zone are independently carried out on the left and right driving wheels 2RL and 2RR respectively. Accordingly, the retard value IGNT of the engine ignition timing is determined in accordance with the brake control zone EZ for both the left and right driven wheel 2RL and 2RR in the steps S18 and S19.

In the steps S20 and S21, if the brake control flag BCFL equals to 1, independent brake control is carried out on the left and right driving wheels 2RL and 2RR, respectively, in accordance with the brake control zone BZ which is determined in the prior steps.

Tests are performed in steps S22–S24 which sets forth the three main conditions for determining whether the engine output control is suspended while the braking control is carried out. When these three conditions are satisfied in the steps S22 through S24, and the prior engine control flag ECFL (K−1) equals to 1 in step S25, namely, when the engine control is in operation in the step S25, the engine Namely, when the absolute value of the present ignition timing retard value IGNT (K) is smaller than the absolute value of the prior retard value IGNT (K−1), since it has a minus sign in the retard value, it becomes IGNT (K) IGNT (K−1), and the engine control is carried out by the prior ignition timing retard value IGNT (K−1) in steps S26 and S27. Further, when the absolute value of the present ignition timing retard value IGNT (K) is larger than the absolute value of the prior retard value IGNT (K−1), the engine control is carried out by the present ignition timing retard value IGNT (K) in the steps S26 and S28. Then, in the former case, the prior ignition timing retard value IGNT (K−1) is supplied to the next control as a preceding value in the steps S29 and S30.

When the decision at the step S20 is no and brake control is not carried out, and in the step 25, when it is judged that the engine control is not in operation, the engine control is not restricted and proceeds to step S28. Further, when at least one of the above-mentioned three conditions is not satisfied, the engine control flag ECFL is set to 0 and the engine control is stopped in the step S31.

Accordingly, in the embodiment explained above, when the slip value S of the driving wheel becomes larger than the predetermined value SET, regardless of whether or not the brake control operation, phase selection is carried out and the brake control zone BZ is calculated. Then a determination of the engine control zone EZ and calculation of the ignition timing retard value IGNT is carried out. (See FIGS. 5 and 6 in the steps 11 through 19).

Then, when the brake control is not carried out, the ordinary engine control is carried out in accordance with the IGNT set in the above steps. However, when the brake control is carried out, and when the three conditions S22–S24 are satisfied, the control which increases the engine output is restricted. (See FIG. 6, steps S20 through S31.)

Namely, even after the slip value of the driving wheel starts to stabilize toward the predetermined slip value by the operation of brake control, both of the brake control phases of the left and right driving wheels 2RL and 2RR are in the pressure increasing phase, and if the engine rotation value N is larger than the minimum predetermined value N (min) and the engine rotation value N is still increasing, the signal for reducing the retard value for ignition timing would not be generated. Therefore, the ignition timing is remains in the retarded state, and by reducing the engine output, the stabilization of the slip is encouraged, and the burden of the braking control is reduced accordingly.

Since the restriction for the engine output increasing control is restricted to the occasion that the first three conditions are satisfied, the engine output is never over reduced and the speed reduction of the vehicle can be avoided.

As explained above, since the engine ignition timing retard value IGNT is set in accordance with the brake control zone BZ, the engine control value does not have to be calculated in accordance with the actual slip of the driving wheels, and the burden for the control unit is reduced. Furthermore, after the restriction on the engine output increasing control is cancelled, when the slip value is reduced by the effect of the braking control, the ignition timing retard value. IGNT is set in accordance with the brake control zone BZ and the engine control is carried out with a comparatively large control value.

Meanwhile, in the above explained embodiment, the decisions of the three conditions are not made when the brake control is not carried out, though, even when the engine control is solely carried out, it is possible to cancel the engine control by the same decision.

Further, it is possible to restrict the engine control when one or two of the three conditions mentioned above are satisfied instead of requiring all three conditions to be satisfied.

Still further, in the above explained embodiment, even though the desired value of the engine control SET (first predetermined value) and the desired value of the brake control (second predetermined value) are different, they can be the same value.

Still further to the above, in the above explained embodiment, the ignition timing control is carried out as the engine control, however, it can be carried out by the control of the throttle opening of the intake passage or the control of the number of cylinders. Further, regarding the determination of the minimum predetermined value of the engine rotation value, the desired slip value for the engine control SET can be used instead of the standard value for engine control STAO.

It is to be understood that although the invention has been described in detail with respect to a preferred embodiment thereof, various other embodiments and variants are possible which fall within the spirit and scope of the invention, and such embodiments and variants are intended to be covered by the following claims.

What is claimed is:

1. A traction control system for a motor vehicle having driving wheels, comprising:
    means for detecting a speed of each of the driving wheels of the vehicle;
    means for calculating a slip value of the driving wheels based on the detected speeds of the driving wheels;
    engine output control means for controlling each of the driving wheels so that the slip value of each of the driving wheels is controlled to become equal to a predetermined first desired slip value when the slip value of each driving wheel is greater than the predetermined first desired slip value;

brake force control means for controlling each of the driving wheels so that the slip value of each of the driving wheels is controlled to become equal to a predetermined second desired slip value when the slip value of each driving wheel is greater than the predetermined second desired slip value, wherein the control carried out by said brake force controlling means includes a phase of increasing brake fluid pressure which includes a plurality of brake pressure increasing modes and a phase of decreasing the brake fluid pressure which includes a plurality of brake pressure decreasing modes;

engine control restriction means for restricting the engine output control means while the braking control is carried out, said engine control restriction means restricts the output of the engine when the braking forces applied to the right and left driving wheels are increasing, and wherein said engine output control means is controlled on the basis of said brake pressure increasing modes.

2. A traction control system according to claim 1, wherein said engine control restriction means restricts the output of the engine when an engine rotation speed is greater than a predetermined value.

3. A traction control system according to claim 1, where said engine control restriction means restricts the output of the engine when engine rotation speed is increasing.

4. A traction control system according to claim 1, wherein said engine output control means sets a control amount of said output of said engine based on a control amount of said brake force.

5. A traction control system according to claim 1, wherein said engine output control means controls an ignition timing of said engine.

6. A traction control system according to claim 1, wherein said predetermined second desired slip value is greater than said predetermined second desired slip value.

7. A traction control system according to claim 1, further comprising slip rate of change calculating means for determining a value of the rate of change of slip of the driving wheels, said value of the rate of change of slip being used by said brake force control means for controlling each of the driving wheels.

8. A traction control system according to claim 1, wherein the vehicle includes an automatic transmission.

9. A traction control system according to claim 1, wherein said means for calculating a slip value for use by said engine output control means includes using a rotation speed of one of the driving wheels which is larger than a rotation speed of the other of the driving wheels.

10. A traction control system according to claim 1, wherein said means for calculating a slip value for use by said brake force control means includes using both driving wheel rotation speeds for controlling each brake force independently.

11. A traction control system according to claim 1, wherein said predetermined first desired slip value is smaller than said predetermined second desired slip value.

12. A traction control system according to claim 1, wherein said engine control restriction means restricts engine torque from increasing based on the engine output control means while the braking control is carried out.

13. A traction control system for a motor vehicle having driving wheels, comprising:

means for detecting a speed of each of the driving wheels of the vehicle;

means for calculating a slip value of the driving wheels based on the detected speeds of the driving wheels;

engine output control means for controlling each of the driving wheels so that the slip value of each of the driving wheels is controlled to become equal to a predetermined first desired slip value when the slip value of each driving wheel is greater than the predetermined first desired slip value;

brake force control means for controlling each of the driving wheels so that the slip value of each of the driving wheels is controlled to become equal to a predetermined second desired slip value when the slip value of each driving wheel is greater than the predetermined second desired slip value, wherein the control carried out by said brake force controlling means includes a phase of increasing brake fluid pressure which includes a plurality of brake pressure increasing modes and a phase of decreasing the brake fluid pressure which includes a plurality of brake pressure decreasing modes;

slip rate of change calculating means for determining a value of the rate of change of slip of the driving wheels, said value of the rate of change of slip being used by said brake force control means for controlling each of the driving wheels; and engine control restriction means for restricting the engine output control means while the braking control is carried out, said engine control restriction means restricts the output of the engine when the braking forces applied to the right and left driving wheels are increasing, and wherein said engine output control means is controlled on the basis of said brake pressure increasing modes.

14. A traction control system for a motor vehicle having driving wheels, comprising:

means for detecting a speed of each of the driving wheels of the vehicle;

means for calculating a slip value of the driving wheels based on the detected speeds of the driving wheels;

engine output control means for controlling each of the driving wheels so that the slip value of each of the driving wheels is controlled to become equal to a predetermined first desired slip value when the slip value of each driving wheel is greater than the predetermined first desired slip value;

brake force control means for controlling each of the driving wheels so that the slip value of each of the driving wheels is controlled to become equal to a predetermined second desired slip value when the slip value of each driving wheel is greater than the predetermined second desired slip value, said brake force control means comprising means for determining whether brake fluid pressure should be changed in each driving wheel, and wherein the control carried out by said brake force controlling means includes a phase of increasing brake fluid pressure which includes a plurality of brake pressure increasing modes and a phase of decreasing the brake fluid pressure which includes a plurality of brake pressure decreasing modes;

slip rate of change calculating means for determining a value of the rate of change of slip of the driving wheels, said value of the rate of change of slip being used by said brake force control means for controlling each of the driving wheels; and engine control restriction means for restricting the engine output control means while the braking control is carried out, said engine control restriction means restricts the output of the engine when the braking forces applied to the right and left driving wheels are increasing, and wherein said engine output control means is controlled on the basis of said brake pressure increasing modes.

* * * * *